United States Patent Office 2,694,707
Patented Nov. 16, 1954

2,694,707

N,N-DI-FATTY MORPHOLINIUM CHLORIDES

John G. Erickson, Minneapolis, Minn., assignor to General Mills, Inc., a corporation of Delaware No Drawing. Application November 23, 1951, Serial No. 257,985

4 Claims. (Cl. 260—247)

The present invention relates to N,N-di-fatty morpholinium chlorides and to a process of preparing the same. These compounds have the following formula:

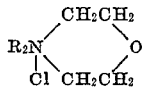

in which R is an aliphatic hydrocarbon group containing from 8 to 18 carbon atoms. These compounds are inexpensive and are of value as detergents, wetting agents and as ingredients for grease formulations. When combined with bentonite they have the ability to gel a wide variety of hydrocarbons, giving greases of useful properties. The morpholinium compounds also have powerful bactericide properties. The compounds are soluble in water to some extent, the lower compounds being most soluble, and are soluble in fats, oils, and hydrocarbon solvents. They are stable at fairly elevated temperatures.

The compounds may be made by the reaction of di-fatty amines with 2-chloroethyl ether in accordance with the following equation:

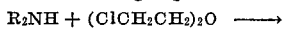

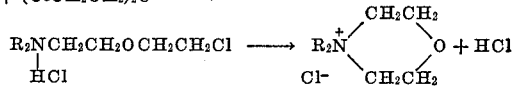

It is therefore an object of the present invention to provide novel N,N-di-fatty morpholinium chlorides having the above formula, and to provide a process of producing such compounds.

The amines which are employed are secondary fatty amines. These may be single isolated fatty amines in which the fatty groups are identical, or they may be amines containing different fatty groups attached to the nitrogen atom. The amines may be derived from the mixed acids of a fat or oil, and accordingly may be either saturated or unsaturated or a mixture of saturated and unsaturated amines. Furthermore, they may be the mixed fatty amines derived from the whole mixed fatty acids of a fat or oil, or from any selected fatty acid or any selected group of the fatty acids of a fat or oil.

The reaction may be carried out either in the presence or absence of a suitable solvent. Suitable solvents include alcohols, glycols, Cellosolves such as 2-methoxyethanol and 2-ethoxyethanol, ethers, and hydrocarbons. The reaction is carired out at a temperature within the approximate range of 60–200° C. At temperatures above 200° C. the products tend to decompose and accordingly such temperatures in excess of 200° C. are not preferred. The rate of reaction is dependent upon the temperature, and accordingly the time period involved may vary from 50 to 100 hours or more at 60° C. to 1 hour at 180–200° C. At around 100° C. the reaction appears to be completed in 15 to 20 hours inasmuch as there appears to be no further change in the appearance of the reaction mixture beyond this time period.

As was shown above, hydrogen chloride is formed during the reaction. Some of the secondary amine employed may be used to neutralize this HCl. In such case 1 mol of amine hydrochloride will be formed for every mol of di-fatty morpholinium chloride. Other materials may be used to neutralize the HCl such as calcium carbonate, sodium hydroxide, potassium hydroxide, sodium carbonate, and similar alkaline compounds. If the secondary amine is employed as the hydrogen chloride acceptor, the amine hydrochloride can be separated from the di-fatty morpholinium chloride by the use of alcohols or glycols in which the amine salt is virtually insoluble.

Example 1

A mixture of 35.3 parts of didodecylamine and 42.9 parts of 2-chloroethyl ether was heated on the steam bath at about 95° C. for 44 hours. It was dissolved in 133 parts of hot ethylene glycol, cooled and filtered to remove didodecylamine hydrochloride. Remaining amine salt was precipitated by adding acetone and acetonitrile. The solution was stripped of acetone, acetonitrile and ethylene glycol under reduced pressure. This treatment left a white solid which was recrystallized from ethyl acetate-methanol mixtures, to yield the glycolate of N,N-didodecylmorpholinium chloride melting with decomposition at 211–212° C. N,N-didodecylmorpholinium chloride itself was obtained by removing the glycol by azeotroping with xylene. It melts at 205–209° C. with decomposition.

Example 2

A mixture of 26.1 parts of dioctadecylamine and 42.9 parts of 2-chloroethyl ether was heated at 95° C. for 50 hours. It was then cooled and recrystallized successively from benzene, chloroform, methanol and ethyl acetate to give pure N,N-dioctadecylmorpholinium chloride, a white crystalline solid, melting with decomposition at 198.5–202.5° C.

Example 3

Twenty parts of commercial bentonite was dispersed in 2500 parts of water. Silica was removed by centrifuging. A solution of 12.5 parts of dioctadecylmorpholinium chloride in methanol was added with stirring. The precipitate which formed was filtered off, washed with water and alcohol, and dried.

A small amount of this bentonite-morpholinium chloride reaction product was mixed with toluene and a thick grease resulted immediately. These bentonite-morpholinium chloride reaction products may be used to gel a wide variety of solvents and oils, including aromatic hydrocarbons such as benzene and xylene, aliphatic hydrocarbons such as mineral oils and lubricating oils, and vegetable oils such as castor oil, linseed oil, and the like.

The following illustrates the production of a heavy mineral oil grease. 9 parts of the bentonite-morpholinium chloride reaction product of Example 3 were mixed with 36 parts of heavy mineral oil and the mixture was passed through a 3-roll paint mill. Thereafter an additional 45 parts of mineral oil were added and the mixture again passed through the mill. This yielded a product containing 10% solids which was a very thick grease. A portion of this grease was mixed with an equal weight of mineral oil and the mixture again milled to yield a product containing 5% solids which likewise was a thick grease.

I claim as my invention:

1. Process of producing compounds having the formula

in which R is an aliphatic hydrocarbon group containing from 8 to 18 carbon atoms, which comprises reacting the amine $R_2NH$ with 2-chloroethyl ether at temperatures within the approximate range of 60–200° C. until the above mentioned compound is formed.

2. Process of producing compounds having the formula

in which R is an aliphatic hydrocarbon group containing from 8 to 18 carbon atoms, which comprises reacting the amine $R_2NH$ with 2-chloroethyl ether at approximately 100° C. for about 15 to 20 hours.

3. Process of producing compounds having the formula

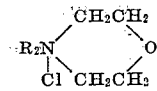

in which R is an aliphatic hydrocarbon group containing from 8 to 18 carbon atoms, which comprises reacting the amine $R_2NH$ with 2-chloroethyl ether at temperatures within the approximate range of 60–200° C. until the above mentioned compound is formed, in the presence of an excess of the amine.

4. Process of producing compounds having the formula

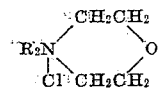

in which R is an aliphatic hydrocarbon group containing from 8 to 18 carbon atoms, which comprises reacting the amine $R_2NH$ with 2-chloroethyl ether at temperatures within the approximate range of 60–200° C. until the above mentioned compound is formed, in the presence of an inorganic alkaline material.

References Cited in the file of this patent

UNITED STATES PATENTS

| Number | Name | Date |
|---|---|---|
| 2,295,504 | Shelton | Sept. 8, 1942 |
| 2,380,325 | Niederl | July 10, 1945 |

FOREIGN PATENTS

| Number | Country | Date |
|---|---|---|
| 438,452 | Great Britain | 1935 |

OTHER REFERENCES

Hart: Chemical Abstracts, vol. 44 (1950), p. 635.